United States Patent [19]
Matsutake et al.

[11] Patent Number: 5,793,901
[45] Date of Patent: Aug. 11, 1998

[54] DEVICE AND METHOD TO DETECT DISLOCATION OF OBJECT IMAGE DATA

[75] Inventors: Osamu Matsutake, Nagaokakyo; Junko Iida, Kyoto, both of Japan

[73] Assignee: Omron Corporation, Kyoto, Japan

[21] Appl. No.: 537,333

[22] Filed: Oct. 2, 1995

[30] Foreign Application Priority Data

Sep. 30, 1994 [JP] Japan ................. 6-259750

[51] Int. Cl.$^6$ ................. G06K 9/32; G06K 9/00
[52] U.S. Cl. ................. 382/294; 382/151; 382/291; 382/296
[58] Field of Search ................. 382/151, 141, 382/142, 143, 144, 145, 216, 287, 288, 289, 291, 294, 296, 297, 293, 295, 218; 348/94, 95

[56] References Cited

U.S. PATENT DOCUMENTS

| | | | |
|---|---|---|---|
| 4,547,800 | 10/1985 | Masaki | 382/151 |
| 5,163,101 | 11/1992 | Deering | 382/216 |
| 5,206,917 | 4/1993 | Ueno et al. | 382/288 |
| 5,495,535 | 2/1996 | Smilansky et al. | 382/151 |
| 5,548,326 | 8/1996 | Michael | 382/151 |
| 5,592,573 | 1/1997 | Eisenbarth et al. | 382/294 |

*Primary Examiner*—Leo Boudreau
*Assistant Examiner*—Bhavesh Mehta
*Attorney, Agent, or Firm*—Dickstein Shapiro Morin & Oshinsky, LLP

[57] ABSTRACT

This invention provides a device and method to detect a degree of misregistration and angle of misrotation of an object image, a device to measure an object using such a degree of misregistration and an angle of misrotation and a device to record data representing a model. A model of the object used is imaged and at least two regions are established in the image data of the model. Delimiting values which are extracted from geometric features of these regions are stored as reference values. The same regions are then extracted from an image of the object, and similar delimiting values are obtained from their geometric features. The conditions so obtained are compared with the stored standard reference values. The degree of misregistration of the object to be processed with respect to the object used as the standard of comparison is calculated from the difference between these two values.

15 Claims, 17 Drawing Sheets

DEVICE AND METHOD TO DETECT DISLOCATION OF OBJECT IMAGE DATA

FIELD OF THE INVENTION

This invention concerns a device and method to detect the dislocation of an object image, such as the degree of misregistration in direction X and Y, and the angle of misrotation with respect to a standard image. This invention further relates to a device to measure an image and a device to record data representing a model using such a degree of misregistration and the angle of misrotation.

BACKGROUND OF THE INVENTION

Devices which inspect a product for defects in its external appearance do so by imaging the object with a camera, comparing the image data obtained in this way with previously recorded data representing a model image (i.e., performing pattern recognition), and determining whether the images match.

In this type of visual inspection, the objects which are inspected are deposited near the exit of the production line and transported in random postures, so the orientation of the object as it enters the region imaged by the camera is not fixed.

All the model images obtained by repeatedly rotating the same model over a given number of degrees (which shall be known, collectively, as the "rotated model") are recorded. Each time the pattern recognition is executed, the data obtained by imaging the object to be inspected are compared with each rotated model image. If there is a high degree of coincidence between the captured image and the model image at a given angle, it is recognized that there is an object to be inspected which is oriented at that angle.

It is thus necessary to record all the multiple images of the model which constitute the rotated model prior to operating the visual inspection device. Prior art devices did this by repeatedly changing the angle of the object (or work) to be used as a normal model and imaging the object with a camera after each adjustment. A specified course of image processing (such as extracting the inspection region) is executed on each image obtained. Every model image is stored in a model memory along with its angle data. An alternative method is to leave the normal object in a fixed position and image it repeatedly while changing the angle of the camera and then execute the processing on the resulting images.

Each time an inspection is performed as described above, the entire object to be inspected must first be recognized. For this reason, the model image of the object must be large, which requires a considerable memory capacity for a single model image. Storing rotated versions of each image also demands a significant memory capacity. Executing pattern matching against a large model image is impractical.

Rather, it is preferable to use a single large model image for the purpose of recognition (for example, a model image oriented at 0 degrees of misrotation) and extract the region to be inspected from the captured image as preprocessing. Then a characteristic smaller region (for example, a corner of the object) is recorded to be used to create the model images to detect degree of misrotation (i.e., the rotated models produced by generating an image at every angle of misrotation). The object is matched against these rotated models in order to detect the angle of misrotation and the degree of misregistration in directions X and Y. Based on the resulting data, a specified region is extracted from the data representing the captured image. This extracted portion is matched against the larger model image which is used for recognition (i.e., the model of the entire object) in order to evaluate the quality of the object.

The prior art device described above is subject to the following problems. To record the rotated models, either the camera or the object or both must actually be rotated, and the object must be imaged after each misrotation. Then specified processing must be performed on the resulting image data. This is a very complex process. To enhance the accuracy of the subsequent inspection, a small angle of misrotation must be used and the largest possible number of misrotated images must be recorded. As a result, the problems discussed above become even more troubling. Rotating the object or the camera accurately over a given number of degrees for every image is also difficult. If the degree of misrotation is inaccurate, the accuracy of the subsequent pattern matching will suffer.

In the actual inspection (i.e., the pattern matching process), a determination is made as to whether there is a high degree of coincidence (i.e., a high correlation value) between the image of the object and each of the many misrotated images obtained as described above. If the actual orientation of the object matches that of the model images, there is no problem. If it does not, the degree of coincidence will necessarily be lower. Some objects may not be detected, or because the angle of a model image with high coincidence will be used as the angle of the captured image, the angle which is presumed may differ from the actual angle at which the object is oriented. When a small number of misrotated model images is used (so that there are large steps between the angles of every two images), it becomes impossible to determine the angle accurately, and the region which is extracted may not be the appropriate one. This will result in a lower recognition rate in the subsequent pattern matching. And because it is not possible to obtain an accurate angle of misrotation in this way, the accuracy with which the degree of misregistration in directions X and Y can be calculated based on this angle will be lower, and the problems described above will be exacerbated.

One way to obviate these problems is to record a large number of model images. This, however, requires a large memory capacity to store the models and increases the processing required to match the images. Speedy determination of matches becomes impossible.

Round objects require no angular correction, so the concept of rotation does not arise. To correct a misregistration, prior art devices would extract the entire circle and use it also as the model image to determine the inspection region. This increased the required memory capacity and the number of calculations, making it impossible to execute the processing at high speed.

SUMMARY OF THE INVENTION

The object of this invention is to solve the problems discussed above by providing a device and method to detect the degree of misregistration and angle of misrotation, a device to measure an object using such a degree of misregistration and an angle of misrotation and a device to record data representing a model which would fulfill the following conditions: they could easily record rotated model images; they would require the recording of only a small number of rotated model images for the correction of misregistrations; and they would be able to detect accurately the angular orientation of the object and/or the direction (and amount) of its misregistration.

To achieve the objectives outlined above, the method for detecting degree of misregistration according to this invention is designed as follows. The object which is to be used as the standard of comparison is imaged, and at least two regions are established in the resulting image data. Delimiting values which are extracted from geometric features of these regions are stored as reference values. The same regions are then extracted from the image of the object to be processed or inspected, and their delimiting values are obtained from their geometric features. The conditions so obtained are compared with the stored standard reference values. The degree of misregistration of the object to be processed with respect to the object used as the standard of comparison is calculated from the difference between these two values.

This invention concerns a device to detect a degree of misregistration and is ideally suited to implement the method described above comprising: a device to store the delimiting values extracted from the geometric features of at least two regions of the object which is to serve as the standard of comparison as well as those regions; a device to store a number of model images, each of which is rotated by a given number of degrees with respect to the image data representing each of the regions; a device which matches the image of the object to be processed against the model images and extracts the corresponding regions from the former; and a device which calculates the delimiting values from the geometric features, based on the result of the matching process, and which calculates the degree of misregistration from the features.

Another solution would be a device configured as described above and additionally equipped with a device to establish specified regions in the data representing the image of the object which is to serve as the standard of comparison and a device to extract the delimiting values from the geometric features of the image data in at least two regions established by the device.

The device may additionally be equipped with a device to record data representing the model images. Such a device would perform an affine transformation on the image data in the regions determined by the device in order to generate image data which are rotated by a given number of angles. This device would generate a number of model images, each of which is rotated over a desired angle of misrotation, and store these images in the storage device for that purpose.

Whatever configuration is chosen for the device to detect the degree of misregistration, the geometric features are either the corners of the object or, if the object is round, the four points on the circumference of the circle which are intersected by the X and Y axes which intersect each other in the center of the circle.

If the object is obliquely oriented by a certain number of degrees, the delimiting values will be the rotation of the linear segment consisting of the X or Y axis linking the two regions with respect to a given reference line. The degree of misregistration which is obtained will be the angle of the rotation of the object with respect to a reference orientation. Alternatively, the delimiting values may be the coordinates of given locations on the line between the two regions or on the same line extended beyond those regions; and the degree of misregistration which is obtained may be the distance of the object from a reference location in an axial direction X or Y.

If the object is circular, the regions may consist of the four regions into which the circumference is divided by the intersection of the X and Y axes; or they may consist of two of the regions created by the intersection of the axes. In the former case, the delimiting values will be the coordinates of the center point of the linear segments linking the regions as opposed diameters; in the latter case, the conditions will be the points of intersection of the tangents which pass through the intersections of the axis in each of the two regions with the circumference of the circle. The device to calculate the degree of misregistration finds the difference between the coordinates of the center point or points of intersection on the object which is to be used as the standard of comparison and the coordinates of the same point or points on the object to be processed. From this difference it obtains the extent of the misregistration in both the X and Y axial directions.

The device to measure the image which employs the device described above compares an image which has just been captured with a standard reference image which is recorded prior to inspection and executes the specified recognition processing. It is equipped with any of the foregoing devices to detect a degree of misregistration. Based on the degree of misregistration output by that device, it corrects the position or orientation of either the image of the object to be processed or the reference image. It then executes the specified recognition processing.

The invention includes a device to record data representing a model image of the object image to be detected. It is used to record rotated images of the model in preprocessing and at various other times. This recording device consists of a device to image the object concerning which data are to be recorded; a device to store the data representing the image which is captured; a device to input the conditions of rotation, which include at least one of the initial angle of misrotation, the final angle of misrotation, and the width of the angle; a device which uses the conditions of misrotation which it obtains to perform a given affine transformation on specified regions in the data obtained by imaging the object, reads out the appropriate data which are stored in the storage device according to the addresses which it obtains, and generates an image which is rotated over a specified number of degrees; and a device which stores a model image generated by the generating device at every angle of misrotation.

Let us assume that the angle at which the model image is oriented when the inspection region on the model is detected differs from the angle at which the actual object is oriented. Regardless of this fact, the location of the inspection region on the model will be obtained accurately. By the same token, the line segment linking the two coordinate points which are obtained accurately will be drawn correctly. By obtaining the location (i.e., a reference value) where the line segment would normally be (this is the standard of comparison) and obtaining the distance that the line on the object is from the reference value, we can accurately obtain the degree of misregistration of the object in terms of its angle of misrotation or its distance from the reference mark in directions X and Y.

If the object is round, the concept of misrotation does not arise, but shift in direction X or Y is still a problem. When the regions are established which include the points of intersection of the X or Y axis and the circumference, the region established on the X axis allows two arcs to be detected accurately with respect to direction X, and the region on the Y axis allows two arcs to be detected accurately with respect to direction Y. The reference values which are based on the location of these regions are used to detect accurately the directional location coordinates. In this way the misregistration of the object with respect to the reference values described above can be accurately obtained. which will be an accurate value for the degree of misregistration in directions X and Y.

The degree of misregistration can be obtained quite accurately in this way. When this type of device is implemented in a device to measure an image, the position and orientation of either the new image data or the reference data can be corrected based on the degree of misregistration before the specified matching (i.e., recognition) processing is executed. This will insure that the recognition processing does not fail.

To record rotated images of a model, the device of this invention collects image data only once with the object oriented at a given angle. When it receives the conditions governing rotation (the angular range in which images are to be generated and the width of the steps in this range), it automatically performs affine transformations, generates a model image at each angle of misrotation, and stores these images in the storage device for that purpose.

DETAILED DESCRIPTION OF THE INVENTION

Figure 1:
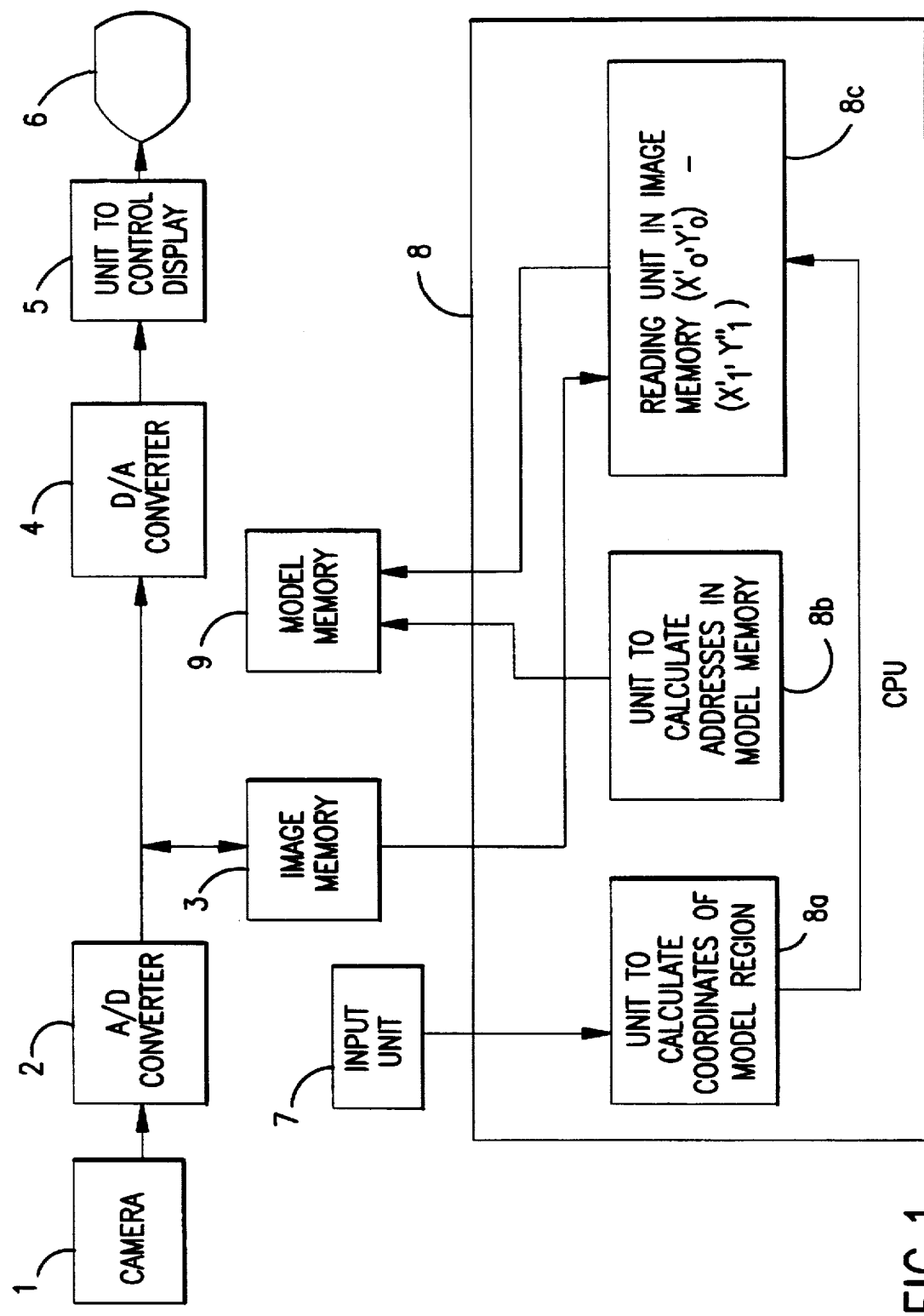
FIG. 1 is a block diagram of an ideal embodiment of a device to record data representing a model according to this invention.

FIG. 1 shows a first preferred embodiment of a device to record data representing a model according to this invention. When the device of this embodiment records data representing a rotated model, the processing which consists of actually imaging an object and collecting the image data is executed once only with respect to a representative model image (e.g., a model image at zero angle of misrotation). A model image at each increment of misrotation is generated and recorded automatically by the device.

More specifically, as can be seen in the same figure, the output of camera 1 (a video or ITV camera or the like) is connected to A/D converter 2. There the video signals obtained when the object is imaged are converted to a series of digital signals, which are carried via a video bus to image memory 3, where they are stored. The image data obtained in this way (i.e., the series of digital signals) are converted to video signals by D/A converter 4 and transmitted to display control unit 5, which outputs the relevant image data to monitor 6 so that they can be displayed. Since the configuration up to this point is identical to that of prior art devices, we shall not give a detailed explanation of it here.

With this invention, the user indicates via input device 7 (a keyboard, mouse, or other device) the conditions governing misrotation (initial angle, final angle and interval) and specifies which region of the image data which have been collected (and which are displayed on monitor 6) is to be recorded as a model. Based on this input, model generator 8 accesses the image data in model memory 3 and generates a model image at each increment of misrotation. The angle of misrotation is recorded together with the model image data in model memory 9. Since the address at which the model at each angle of misrotation is to be stored is already determined, the image data and angle data will be associated by being recorded at the same address.

In this example, model generator 8 consists of a CPU. Calculation unit 8a calculates the coordinates of the model region; calculation unit 8b calculates an address each time a model image is recorded in model memory 9; reading unit 8c reads out the data stored in image memory 3 which correspond to the coordinates obtained by unit 8a and stores them in model memory 9. The capabilities of each of these units will be discussed below.

Figure 2:
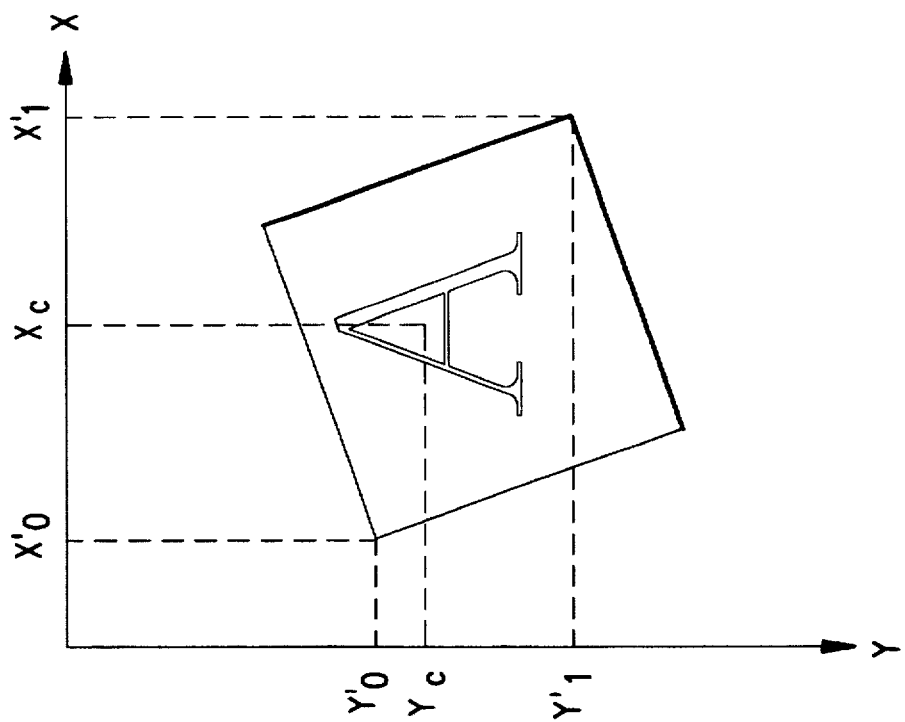
FIG. 2 illustrates the principle underlying the operation of this device.
Figure 2:
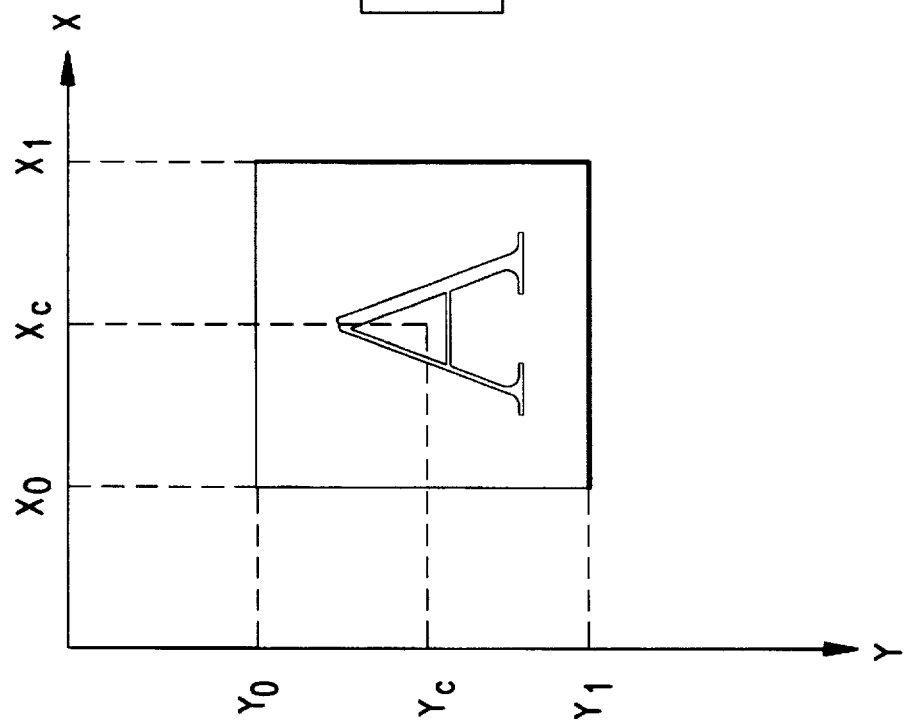

Calculation unit 8a finds the coordinates of rotated model region R' based on the conditions it receives from input device 7. In this example, the data representing the basic model image (at 0° of rotation) are rotated over a given number of angles by means of an affine transformation. Let us assume a basic model image like that shown in FIG. 2(A). The coordinates of the highest points in the diagonals which define model region R with center of gravity $(X_c, Y_c)$ are $(X_0, Y_0)$ and $(X_1, Y_1)$. If we rotate model region R over a specified angle $\theta$ using the center of gravity as the center, we obtain a new model region R', for which the highest coordinates on the diagonals are $(X'_0, Y'_0)$ and $(X'_1, Y'_1)$. Thus the image data representing region R' constitute a model image which has been rotated by Q degrees. The relationship between any desired location (X', Y') in rotated region R' and location (X, Y) in the original, unrotated image data is represented by Formula 1, given below. The brightness data for the pixel at location (X, Y) in the original image data will be identical to those for the pixel at (X', Y') in the coordinate system which has been rotated over angle $\theta$.

$$\begin{pmatrix} X' \\ Y' \end{pmatrix} = \begin{pmatrix} \cos\theta & -\sin\theta X_c \\ \sin\theta & \cos\theta Y_c \end{pmatrix} \begin{pmatrix} X - X_c \\ Y - Y_c \end{pmatrix} \quad \text{Formula 1}$$

Calculation unit 8a first finds the center $(X_c, Y_c)$ of model region R based on the coordinates $(X_0, Y_0)$ and $(X_1, Y_1)$ of the highest points of the diagonals which define model region R, which have been transmitted from input device 7.

The coordinates of the highest points can be input via a keyboard, or a mouse can be used to click on the region to be recorded in the image data displayed on monitor 6, and coordinate values can be obtained for the spots which are clicked on.

θ incremented at each step by the angular interval (i.e., the width of the step) received from input device 7. The coordinates are obtained for every pixel from (X'$_0$, Y'$_0$) to (X'$_1$, Y'$_1$) each time the image is rotated by θ degrees. The coordinates of the rotated model image R' which is obtained are sent to reading unit 8c along with the angle data (θ).

Figure 3:
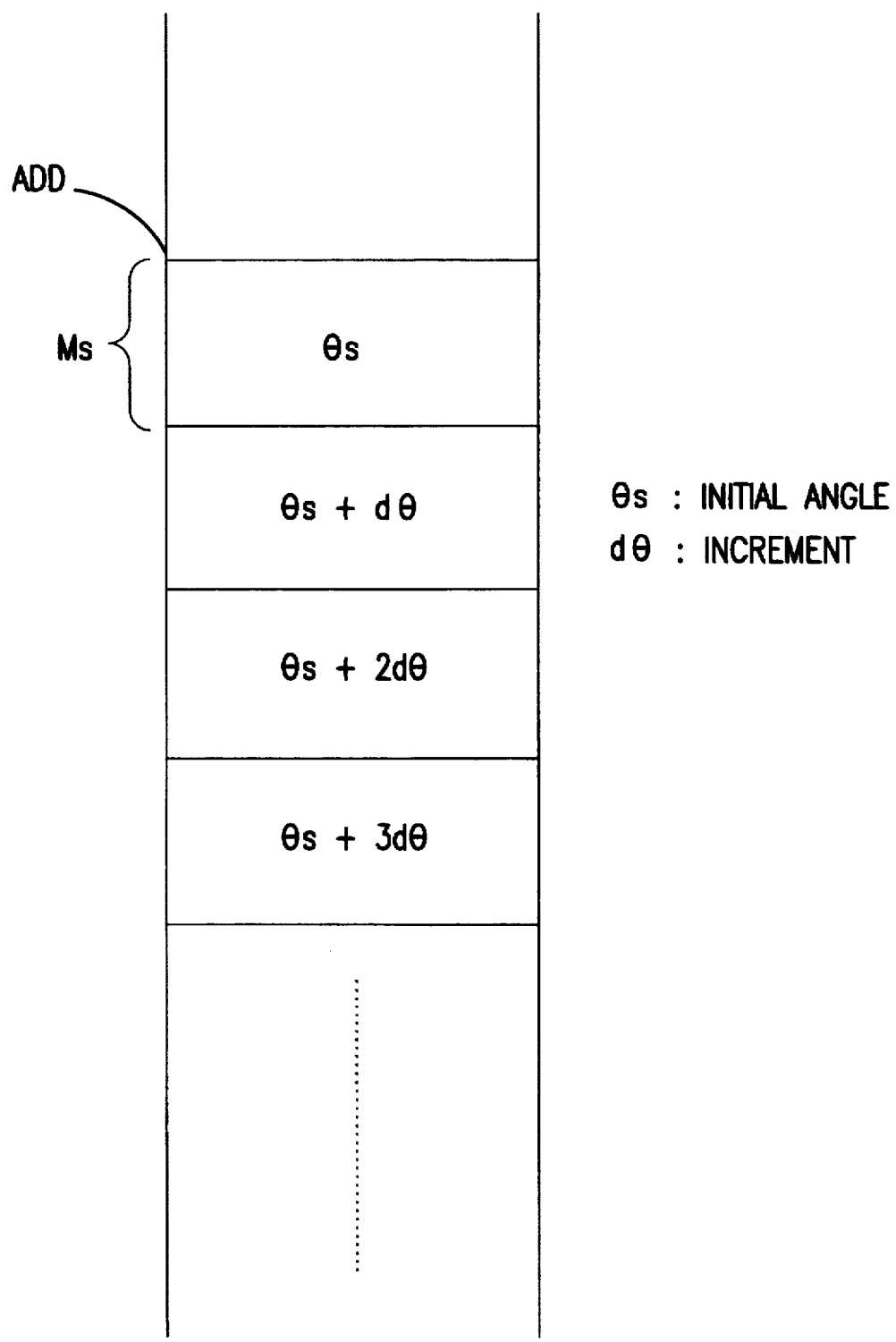
FIG. 3 gives an example of how the model memory might be configured.

The data representing the model images which are ultimately generated at all angles are recorded in model memory 9. In this embodiment, they are stored at addresses in memory 9 according to the rule given below. FIG. 3 shows how model memory 9 is set up. As can be seen in the figure, the data are stored sequentially beginning with initial angle θ$_s$. If we call the leading address for initial angle θ$_s$, ADD, then the leading address in the address region storing the image generated at each angle of misrotation can be obtained using the formula given below. Calculation unit 8b executes operations according to this formula and outputs their results.

$$\text{Address} = ADD + M_s \times \frac{(\Theta_n - \Theta_s)}{d\Theta} \quad \text{Formula 2}$$

where $\Theta_n$=Angle of rotation (d$\Theta$×n), $\Theta_s$=Initial angle, d$\Theta$=Angular interval, and $M_s$=Size required for one model.

Reading unit 8c accesses in image memory 3 the data representing each pixel between (X'$_0$, Y'$_0$) and (X'$_1$, Y'$_1$) which it has received and gets the corresponding brightness data, which it stores at the corresponding address in model memory 9 obtained from calculation unit 8b.

Figure 4:
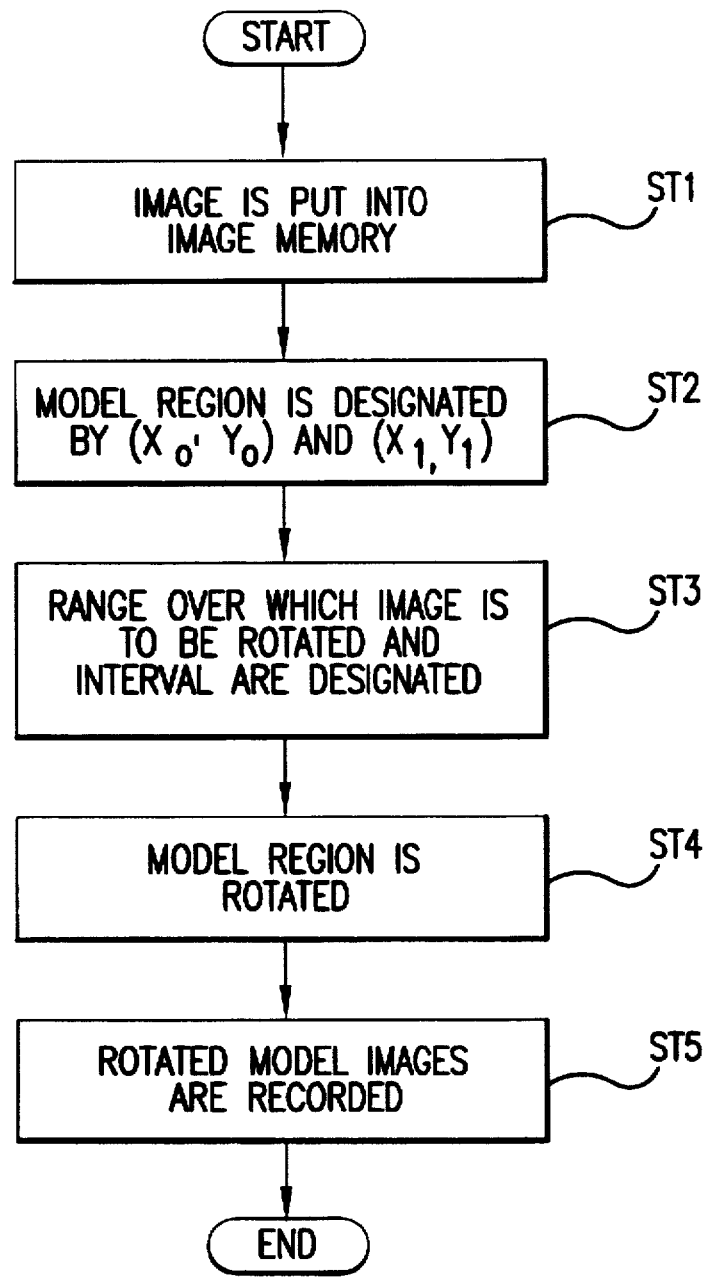
FIG. 4 is a flowchart to illustrate the operation of this embodiment.

We shall next discuss the functions of the devices in the embodiment with reference to the flowchart in FIG. 4. First, the object which is to provide the model image recorded at zero angle of misrotation is imaged by camera 1 and transmitted to the image memory (Step 1). In the example shown in FIG. 5(A), "ABC" would be imaged. The border enclosing FIG. 5(A) encloses all the image data stored in image memory 3. The image represented by the data stored in memory 3 is displayed on monitor 6.

Next, the operator uses input device 7 to indicate the location of the model region R to be recorded (Step 2). More specifically, he may use a mouse to specify the location on monitor 6 of the two apices (X$_0$, Y$_0$) and (X$_1$, Y$_1$) which define region R. He also inputs the range of the angle of misrotation and the angular interval at which the generated model images will be rotated in this range (Step 3). These data are also input via input device 7.

The Steps 2 and 3 are processing which is actually executed by the operator. Based on this processing, model generator 8 operates and rotates the image over the specified angle. In this way model generator 8 obtains model image R', which is oriented at the initial angle of misrotation (See FIG. 5(B)). The image data within region R' are recorded in model memory 9 as representing the model image at that angle. The angle of misrotation is incremented, starting at the initial angle, by the specified interval specified. Each time it is incremented, the processing is executed, and the model images at every angle are recorded sequentially until the image has been rotated to the final angle. In this way all the rotated model images are recorded (Steps 4 and 5). The processing involved in capturing the actual image of the object is performed only in Step 1. Thereafter, misrotated images are generated automatically by model generator 8 and recorded.

Figure 5A:
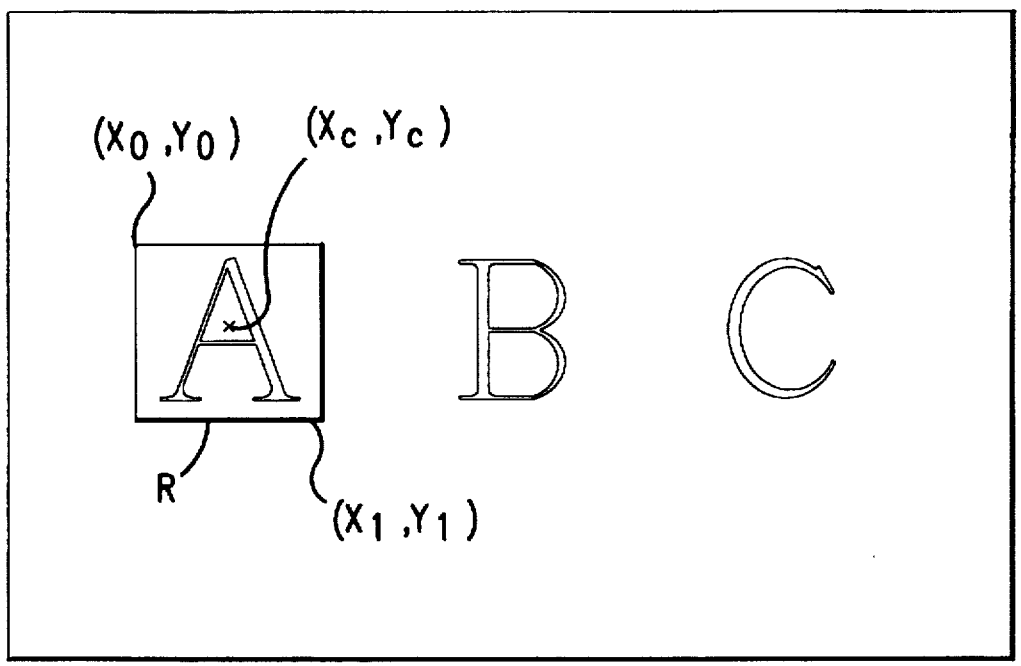
FIGS. 5(A)–5(B) illustrates the process of recording the data.
Figure 5B:
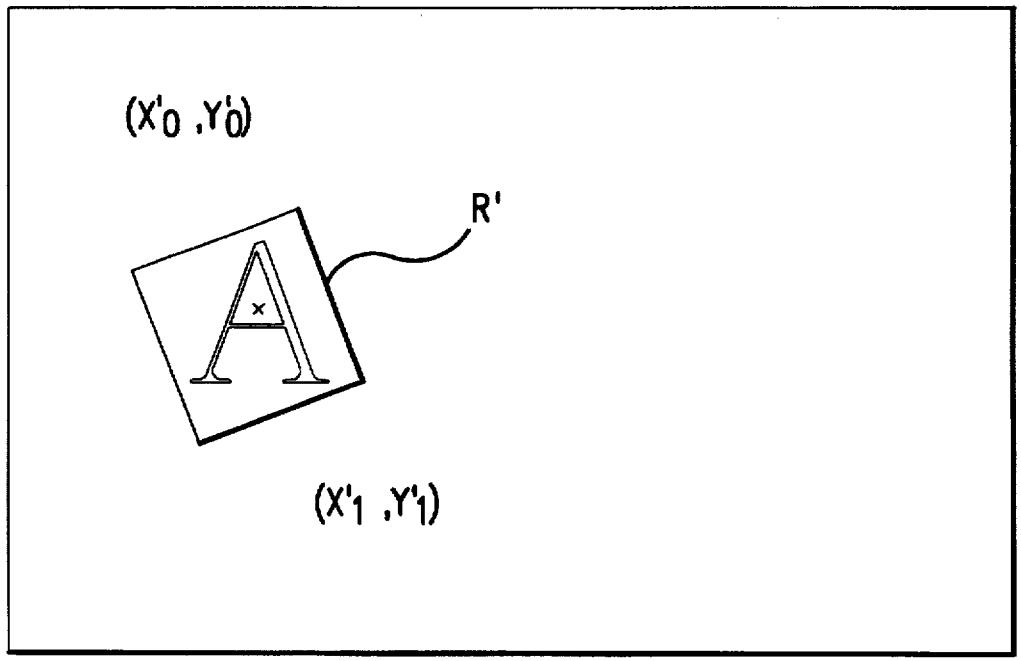
Figure 6A:
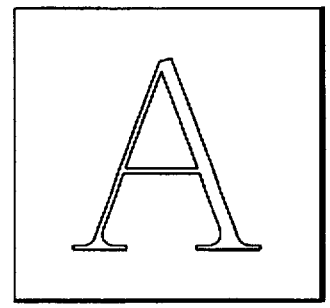
FIGS. 6(A)–6(D) shows examples of rotated model images generated and recorded by this embodiment.
Figure 6B:
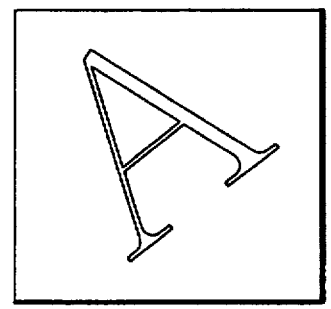
Figure 6C:
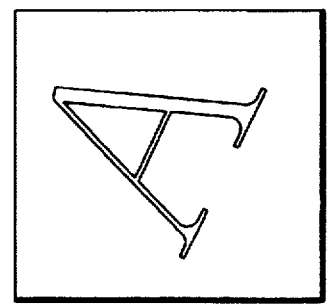
Figure 6D:
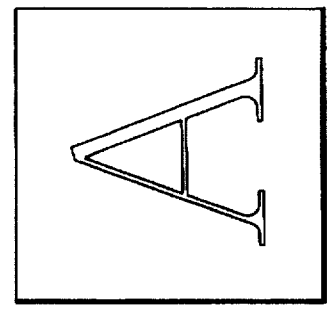

When the model image of the letter A in FIG. 5(A) is recorded each time it is rotated, starting from its angle of 0°, using a given angular increment (say, 30°), the images which will be recorded sequentially in model memory 9 starting with the leading address ADD will be rotated by 0° (See FIG. 6(A)), 30° (See FIG. 6(B)), 60° (See FIG. 6(C)), 90° (See FIG. 6(D)), and so on.

Figure 7:
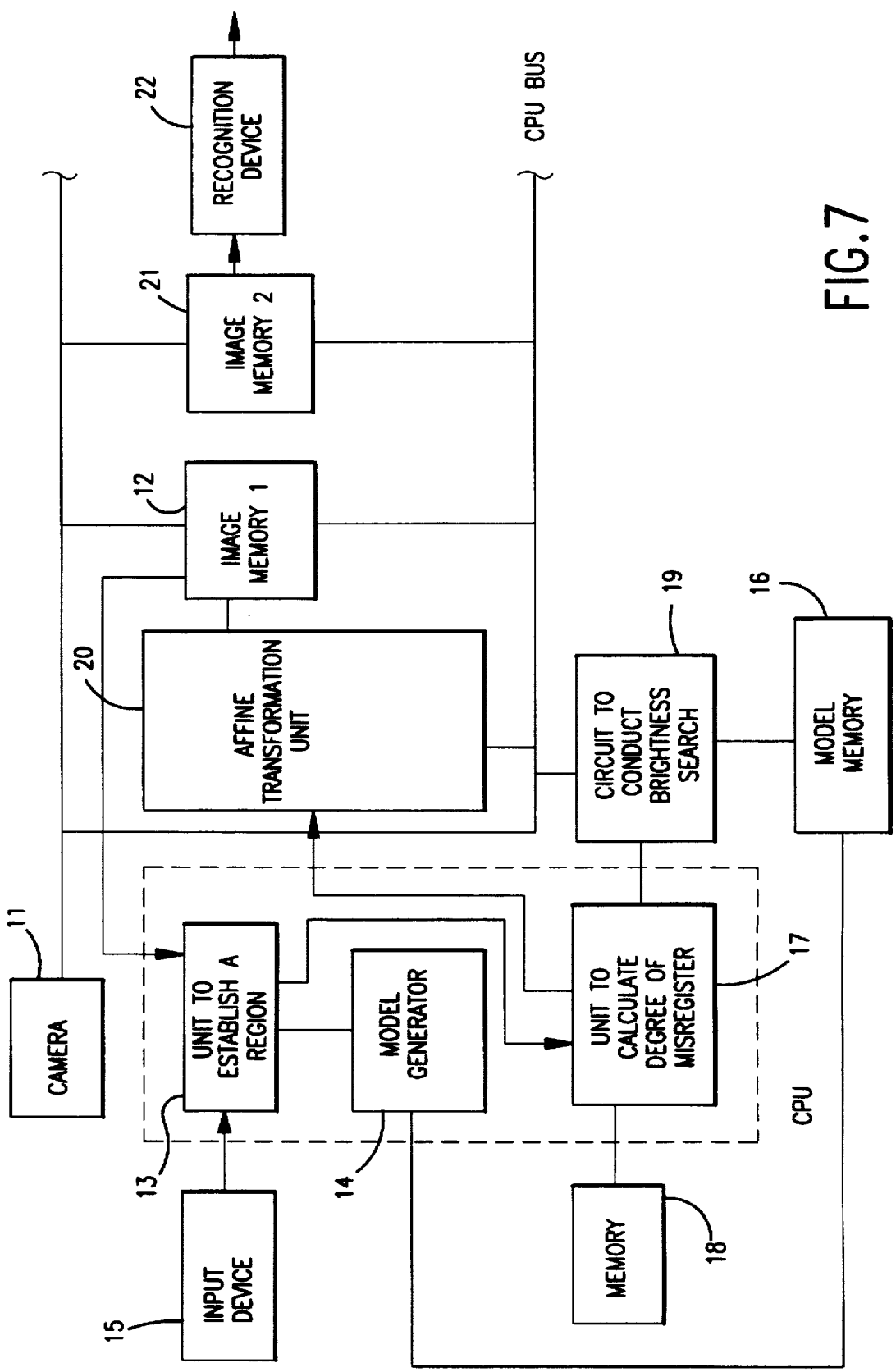
FIG. 7 is a block diagram of a device to measure an image which contains an ideal embodiment of the device to detect degree of misregistration according to this invention.

FIG. 7 shows an example of a device to measure an image which contains a second preferred embodiment of the device to detect degree of misregistration according to this invention. As can be seen in the drawing, the output of camera 11 is transmitted to image memory 12 via a bus. Although the specific details are not shown in the drawing, the output of camera 11 (viz., video signals) is digitized by an A/D converter before being recorded in memory 12, just as in the device shown in FIG. 1 above.

Unit 13 specifies a region to be extracted from the image data stored in memory 12. Based on the image in the extracted region, model generator 14 generates a model image at each angle of misrotation specified by the conditions which it receives from input device 15. These rotated images are stored in model memory 16.

Input device 15 is equivalent to input device 7 in the embodiment pictured in FIG. 1; model generator 14 (together with device 13 to establish a region) is equivalent to model generator 8. Devices which have a basically identical configuration may be used for these components. For the sake of convenience, model generator 14 and device 13 are shown as independent components; however, in the embodiment pictured in FIG. 1, model generator 8 is operated by the CPU. In this embodiment, too, these components may be contained in the CPU.

Figure 8:
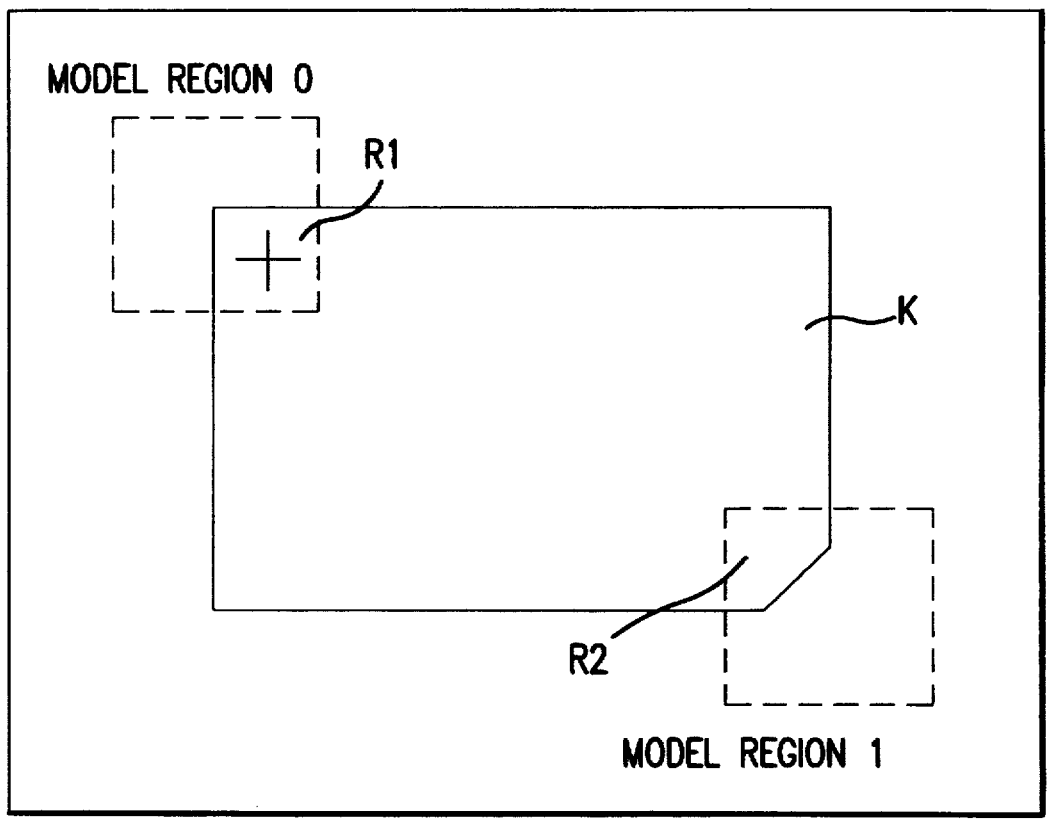
FIG. 8 gives an example of an object to be processed.

An example of a misrotated image to be recorded using model generator 14 is shown in FIG. 8. The image is captured by camera 11, and the image data are stored in image memory 12. The line framing FIG. 8 encloses the entire region containing image data. The area K is the object to be inspected (or processed). Devices 15 and 13 designate a number (in this case, two, regions R$_1$ and R$_2$) of model regions on object K. Using the images in regions R$_1$ and R$_2$ as a standard, model generator 14 generates misrotated images of the model regions.

More specifically, the operator uses input device 14 to designate two locations on object K which have significant geometric features. In this case they are regions R$_1$ and R$_2$ on opposite apices of one of the diagonals. In the example shown in FIG. 9, the feature in R$_1$, the region which is contained in model image 0, is the figure of a cross; the feature in R$_2$, which is contained in model image 1, is the contour of the object.

Figure 9:
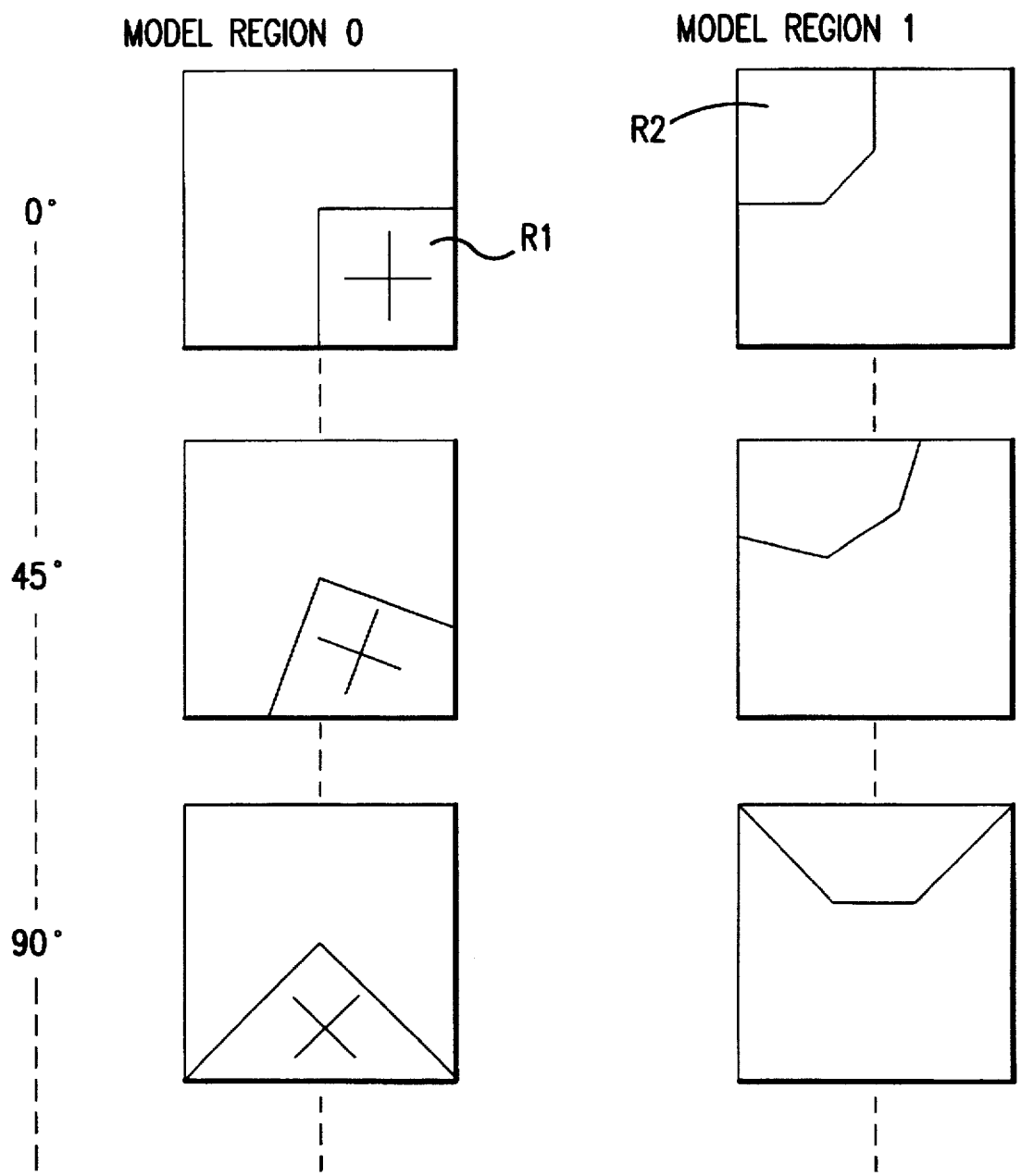
FIG. 9 shows examples of rotated model images to be recorded.

An affine transformation is performed on specified portions of the image data in image memory 12. Model generator 14 generates rotated images of both the model images, 0 and 1 (regions R1 and R2), as shown in FIG. 9, and stores them at specified addresses in model memory 16, the storage device for that purpose. Since the specific processes by which the rotated images are generated and recorded in model memory 16 are identical to those used in the recording device discussed earlier, we shall not give a detailed explanation here.

The designated model regions in the images data representing object K (i.e., the reference image at 0° of rotation) which are stored in memory 12 as discussed above are transmitted to device 17, the device to detect degree of misregistration. Device 17 obtains specified reference values needed to calculate degree of misregistration and records them in memory 18, the storage device for that purpose.

Figure 10:
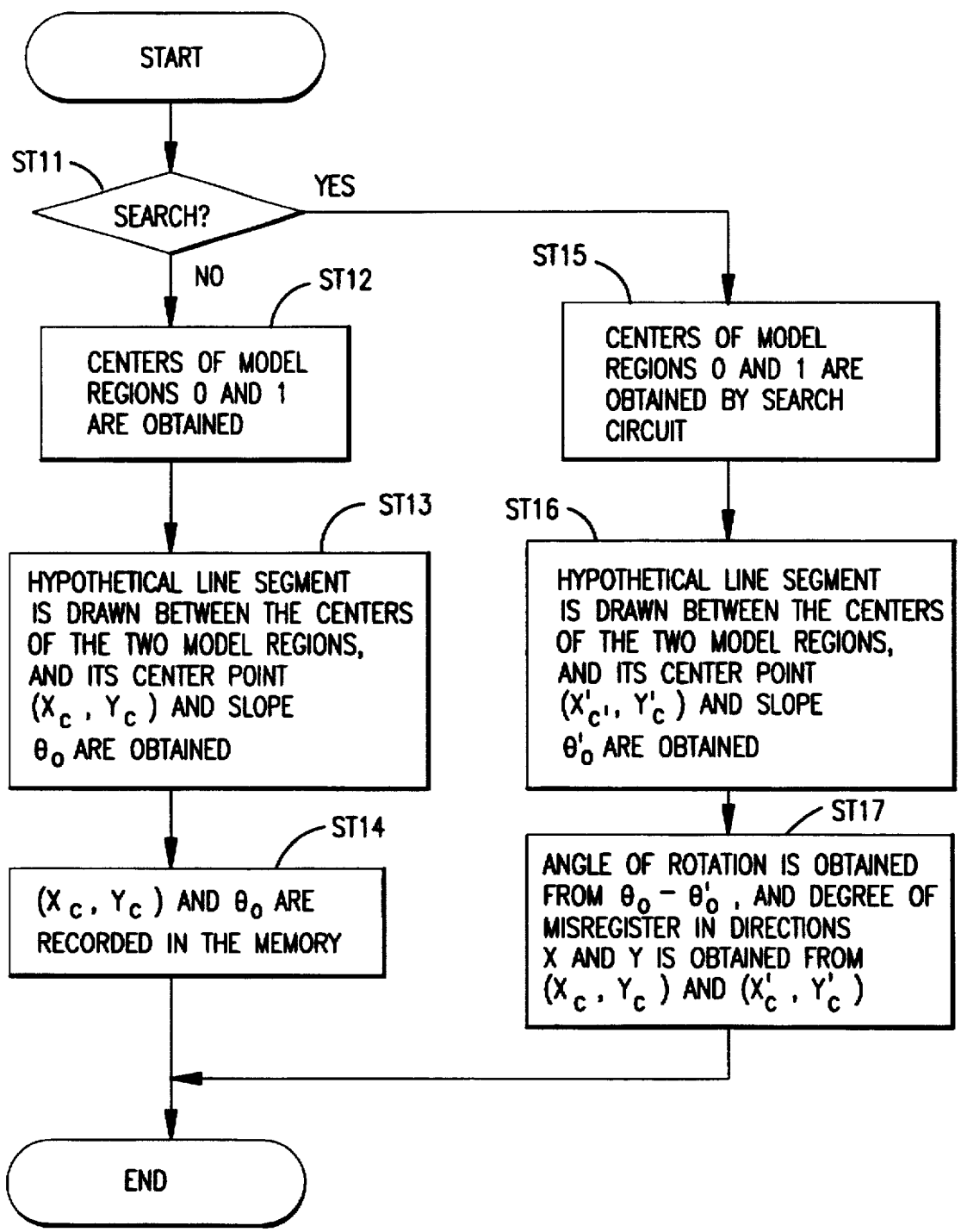
FIG. 10 is a flowchart to illustrate the function of the unit which calculates degree of misregistration.

Specific details of the processing are given in FIG. 10. A determination is made as to whether an actual search is necessary (Step 11). If this has been determined during preprocessing, we go to Step 12 and obtain the centers of the model regions. We also obtain the coordinates ($X_c$, $Y_c$) of the center point of the hypothetical line segment linking the center point of the regions, which are defined by the delimiting values, and the angle $\theta_0$ of this line with respect to the X axis. The coordinates ($X_c$, $Y_c$) of the center point and angle $\theta_0$ are stored in memory 18 (Steps 13 and 14).

Figure 11:
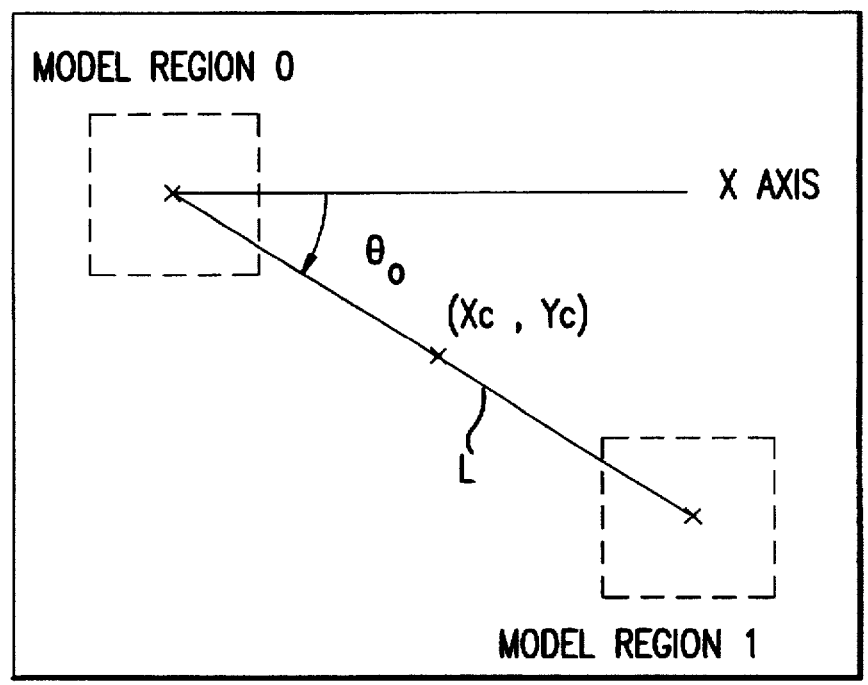
FIG. 11 illustrates the operation of the unit which calculates degree of misregistration.

Let us use object K in FIG. 8 to show a concrete example of this processing. In this case (See FIG. 11) we obtain the center point ($X_c$, $Y_c$) of line segment L linking the center points of model images 0 and 1, we obtain the angle $\theta_0$ of L with respect to the X axis, and we record these values.

When the misrotated images and the reference values are obtained and stored in memories 16 and 18 respectively, the preprocessing (i.e., the recording processing) executed prior to inspection is completed.

Circuit 19, which executes a brightness search, is connected to image memory 12. Circuit 19 causes camera 11 to image the object to be inspected for quality and searches the stored image data for a region which matches any of the rotated images stored in model memory 16. More specifically, it considers each pixel in the image data as the center of an image which it matches against every rotated image. When it finds an image with a high degree of coincidence, it concludes that it has found one of the model patterns (in this case, the pattern of model image 0 or 1). The coordinate values for the central pixel in that image (i.e., the one being processed) are transmitted to device 17, the device to calculate degree of misregistration.

In addition to the recording function discussed above, device 17 executes specified calculation processing based on the coordinate data transmitted from circuit 19, as shown in Steps 15 through 17 in FIG. 10. In this way it obtains the angle of misrotation of the object and the degree of misregistration in directions X and Y. Specifically, it finds the center coordinates of model regions 0 and 1, the two regions which are detected (Step 15). It obtains the coordinates ($X'_c$, $Y'_c$) of the center point of the line segment linking the centers of the two regions. It obtains the angle $\theta'_0$ of this line segment with respect to the Y axis (Step 16). It obtains the difference between these center point coordinates ($X'_c$, $Y'_c$) and this angle $\theta'_0$ and the reference values ($X_c$, $Y_c$) and $\theta_0$. The results of the calculations $d_x = X_c - X'_c$ $d_x = Y_c - Y'_c$ $\theta = \theta_0 - \theta'_0$ yield the degree of misregistration (misregistration in directions X and Y) and the angle of misrotation (Step 17).

Figure 12:
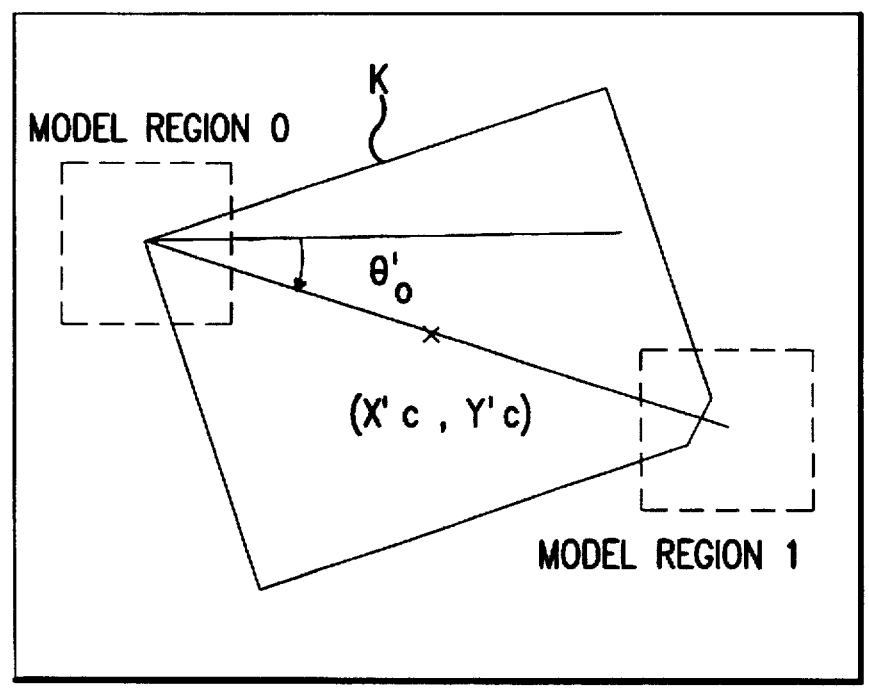
FIG. 12 illustrates the operation of the unit which calculates degree of misregistration.

As can be seen in FIG. 12, the center coordinates of the model regions will be obtained correctly even when the orientation of object K at the time it is imaged does not match the angle of misrotation of any of the recorded model images. Thus the angle $\theta'_0$, with respect to the X axis, of the line linking the two correct coordinate locations on the object which are obtained in this way (i.e., the center coordinates of model regions 0 and 1) will show accurately the angular orientation of the object. The difference between the previously obtained angle $\theta_0$ of the line with respect to the X axis when the object is not rotated (i.e., at an angle of misrotation of 0°) and the angle $\theta'_0$ which is calculated will yield the angle of inclination $\theta$ of the object which has been imaged with respect to the reference image, whose angle of inclination is 0°. In this way the angle of the object can be obtained accurately when the object is not oriented at the same angle as one of the misrotated images.

By the same principle, we can find the distance $D_x$ of the misregistration in the direction of the X axis from the difference between the accurate coordinates $X'_c$ of the center point of the line segment and $X_c$, and the distance $D_y$ in the direction of the Y axis from the difference between $Y'_c$ and $Y_c$. In this embodiment, the misregistration in directions X and Y is obtained using the center point coordinates of the line segment as a reference in order to minimize accidental error. However, any point on the line segment may be used, or any desired location on an extension of that line.

In this embodiment, the operation of affine transformation unit 20 is based on the angle of misrotation of the object and the distance of its misregistration in directions X and Y which are obtained by the calculation unit 17. The image data representing the object, which are stored in image memory 12, are misrotated over angle $\theta$ with coordinates ($X'_c$, $Y'_c$) as the center. The image data are also moved Dx in direction X and $D_y$ in direction Y. In this way they are transformed so as to conform to the orientation and position of the reference image stored during preprocessing; the correctly oriented image is then stored in image memory 21. The formula used to execute the affine transformation is here given as Formula 3.

$$\begin{pmatrix} u \\ v \end{pmatrix} = \begin{pmatrix} \cos\theta & -\sin\theta & X_c + dX \\ \sin\theta & \cos\theta & Y_c + dY \end{pmatrix} \begin{pmatrix} X - X_c \\ Y - Y_c \\ 1 \end{pmatrix} \quad \text{Formula 3}$$

The transformed image data (i.e., the image whose misregistration has been corrected) stored in image memory 21 are transmitted to recognition device 22, which executes pattern matching or some other specified recognition processing in order to evaluate the quality of the entire object which is imaged. Since the recognition processing can be executed using any of various algorithms well known in the prior art, we will not present a detailed explanation of it here.

In the embodiment described above, device 17 obtained both the angle at which the object is misrotated and its degree of misregistration in directions X and Y. However, the invention is not limited to this case only; it would be equally acceptable for the device to detect one of these types of misregistration or misrotation only. Also, in this example, device 17 detects the delimiting values in the image data based on reference values and the actual object. It thus functions as both the device to detect degree of misregistration/mistoration and as the device to establish delimiting values referred to as parts of this invention.

Figure 13:
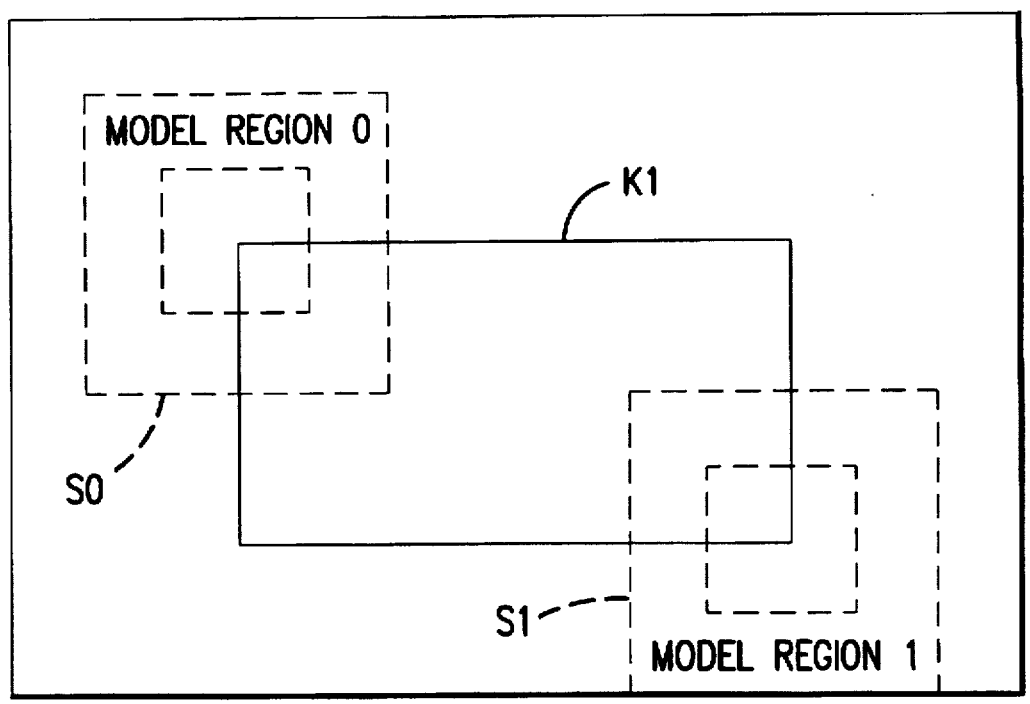
FIG. 13 illustrates the operation of the unit which calculates degree of misregistration.

If the object shown in FIG. 8 is misrotated, model regions 0 and 1 will not coincide with the same portions of the model image, so there is no possibility that some other part of the image will be mistakenly recognized as the model region. With an item shaped like object $K_1$ in FIG. 13, however, i.e., a rectangle without markings, misrotating the object 180° will cause model region 0 to coincide exactly with model region 1, which raises the possibility that model region 1 will be mistakenly recognized as model region 0. In fact, though, the brightness search minimizes the probability that the patterns in the two images will match. Further, if there are portions of the images which match when the object is misrotated, designating those portions as the model regions will not cause any problems from a practical point of view.

To address the problem of a misrotated image accidentally matching the model when only a slight degree of misregistration (both angular and in directions X and Y) is visible on the screen, we limit the portion of the image data which is to serve as the search zone for each of the model images. In other words, circuit 19 searches for model region 0 only in search zone $S_0$, and for model region 1 only in zone $S_1$. As an alternative to limiting the search zones in this way, we might instead place a limit on the rotational angle of the model images (say, a range of ±15) to be generated and stored in model memory 16.

The embodiment discussed above detects both the angular orientation of the object to be inspected and its misregistration in directions X and Y. However, the invention is not limited to this case only. It would be equally acceptable for the device to obtain only the angular orientation.

Furthermore, the embodiment we have been discussing generates the misrotated images which are stored in the model memory via a device which employs the same principle as the recording device of this invention. That is, it automatically generates a number of misrotated images from a single set of image data. However, the invention is not limited to this case only. It would also be possible to record the misrotated images by appropriately rotating either the object or the camera or both and capturing an image of the object after each misrotational step. After all the misrotated images are created, a specified region of each image is extracted and recorded as the model image.

Figure 14:
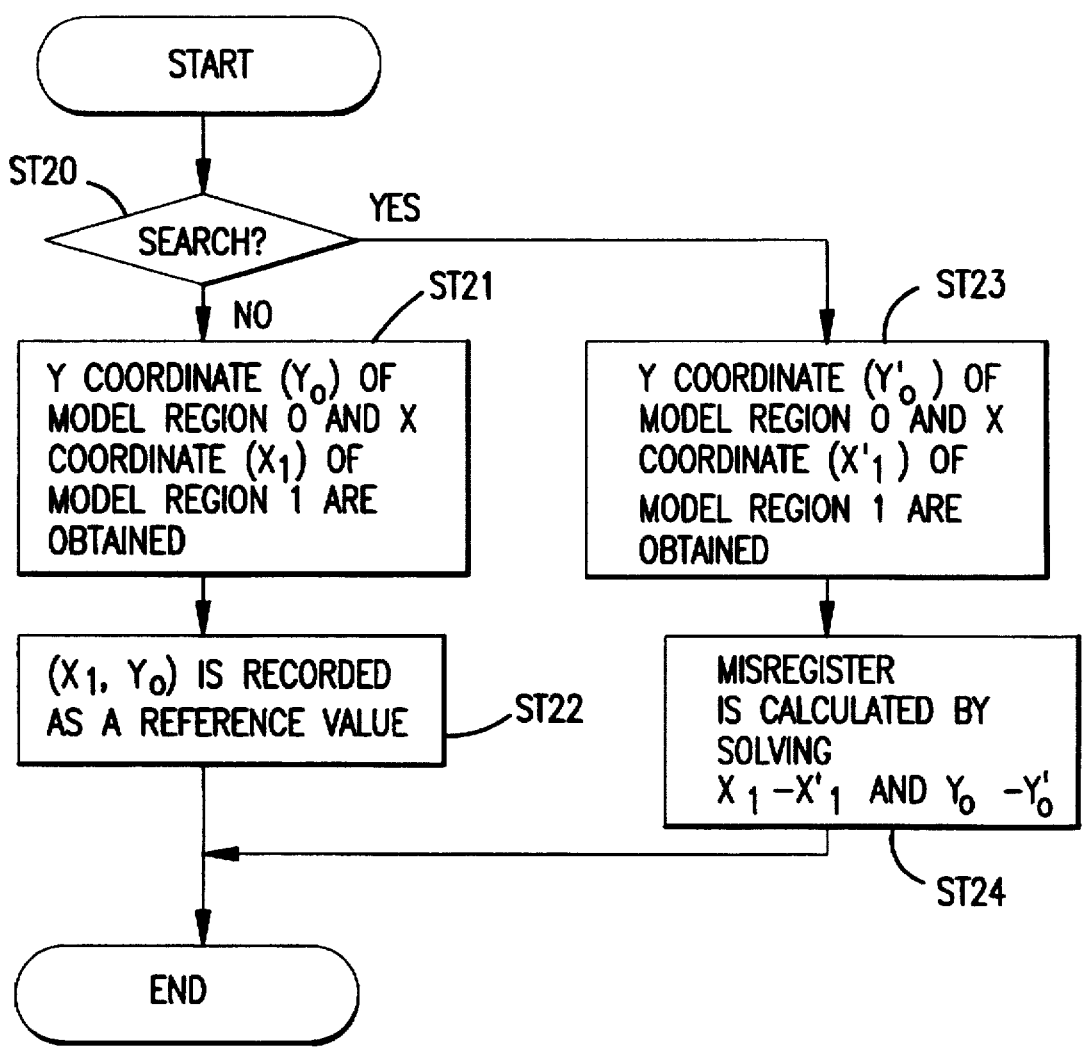
FIG. 14 is a flowchart which illustrates the function of another unit to calculate degree of misregistration.

In the second preferred embodiment disclosed above, since the object to be inspected is a rectangle or some other shape which is oriented in a specified way, it is necessary to detect its angle of orientation. In the third preferred embodiment disclosed here, if the object to be inspected are, for example, round, we would need to know and correct only its misregistration in directions X and Y. The function of calculation unit 17 in FIG. 7 would be that illustrated by the flowchart in FIG. 14.

Figure 15A:
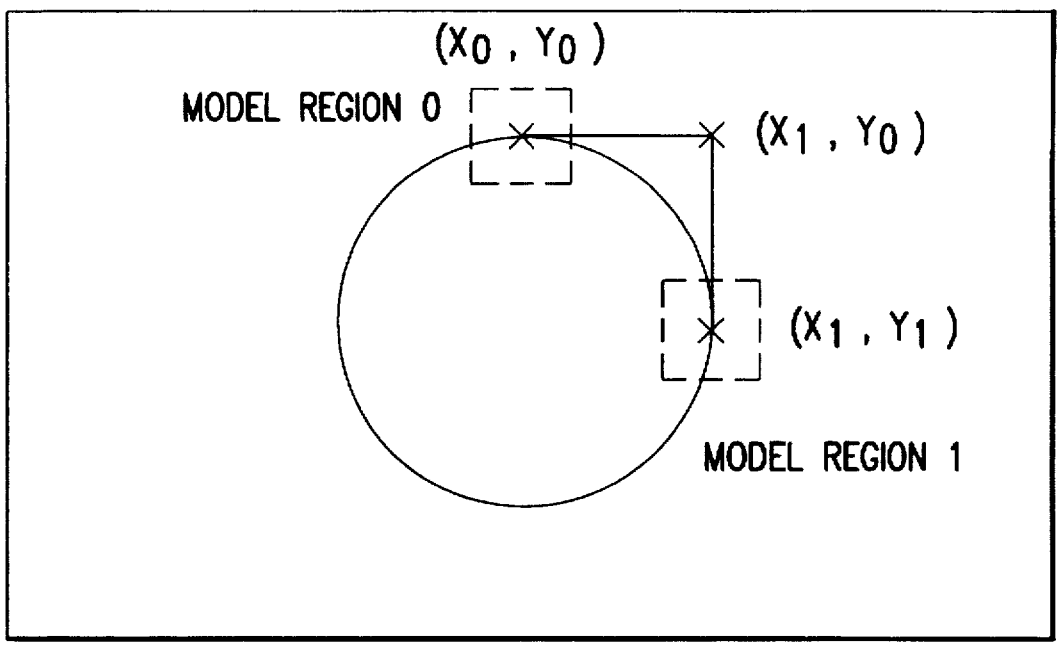
FIGS. 15(A)–15(B) illustrates the operation of the unit which calculates degree of misregistration.
Figure 15B:
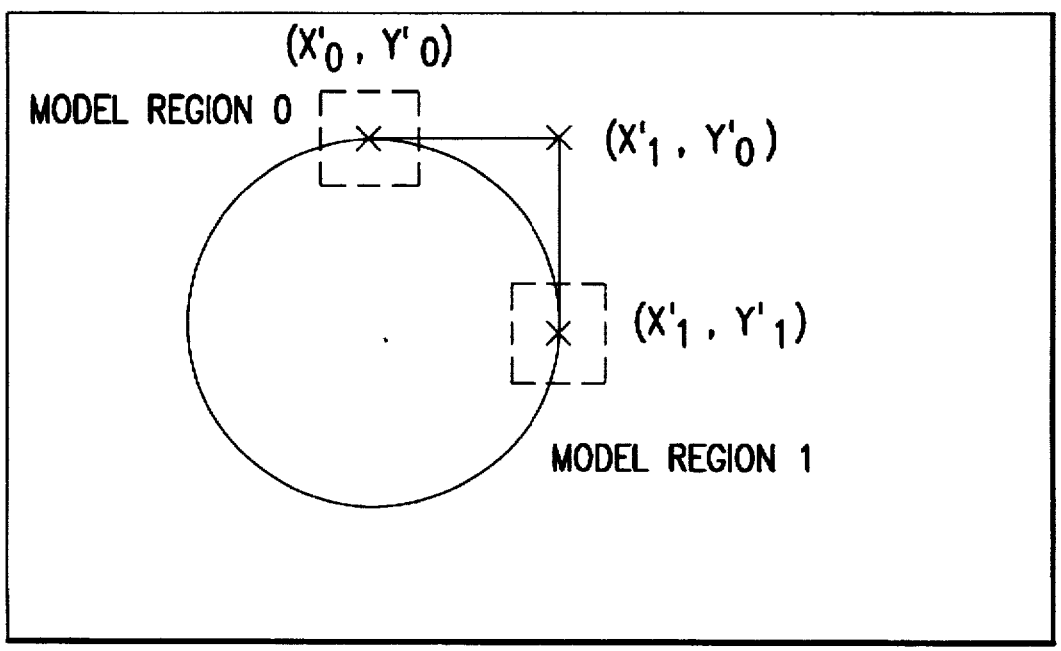

As preprocessing, the object whose image is to become the basic model image is imaged with a camera, and the image data are stored in image memory 12. If the image which is stored is like that shown in FIG. 15(A), we hypothesize X and Y axes passing through the center of the circle. We obtain a model region 0 whose center $(X_0, Y_0)$ is one of the points where the X axis intersects the circle (in this example, the point on top of the circle); we obtain a model region 1 whose center $(X_1, Y_1)$ is one of the points where the Y axis intersects the circle (here, the point on the right side). The coordinates $(X_1, Y_0)$ of the intersection of the tangents which pass through the centers of these two regions are stored in memory 18 of FIG. 7 as a reference point (Steps 20 through 22). At the same time, model generator 14 operates just as in the embodiment discussed earlier, generating misrotated images of each of the model regions and storing them in model memory 16.

The actual search processing executed by circuit 19 consists of searching the data representing the object which is imaged. Model regions 0 and 1 are detected, their center coordinates $(X'_0, Y'_0)$ and $(X'_1, Y'_1)$ are found, and the coordinates $(X'_1, Y'_0)$ of the intersection of the tangents passing through the centers of the two regions, which correspond to the reference values, are found (Step 23).

Next, the differences dX and dY are found between the reference values $(X_1, Y_0)$ and the intersection $(X'_1, Y'_0)$ by solving $$d_x = X_1 - X'_1$$

$$d_y = Y_0 - Y'_0$$

In this way, the degree of misregistration in each direction is obtained (Step 24). When the degree of misregistration is found in this way, the image data representing the object to be inspected are moved in parallel (i.e., scrolled) the distance of the misregistration, just as in the embodiment discussed earlier. The specified matching processing is then executed to determine the quality of the object.

When a model region is set up on each of the axes, as described above, the accuracy of the search will be good in the axial direction (i.e., direction X) for model region 0, which lies on the X axis, and poor in direction Y. By the same token, the search for model region 1, which lies on the Y axis, will be highly accurate in the axial direction (here, direction Y) and less accurate in direction X. Using two coordinate positions which yield an accurate search allows us to calculate the degree of misregistration with high accuracy.

Figure 16:
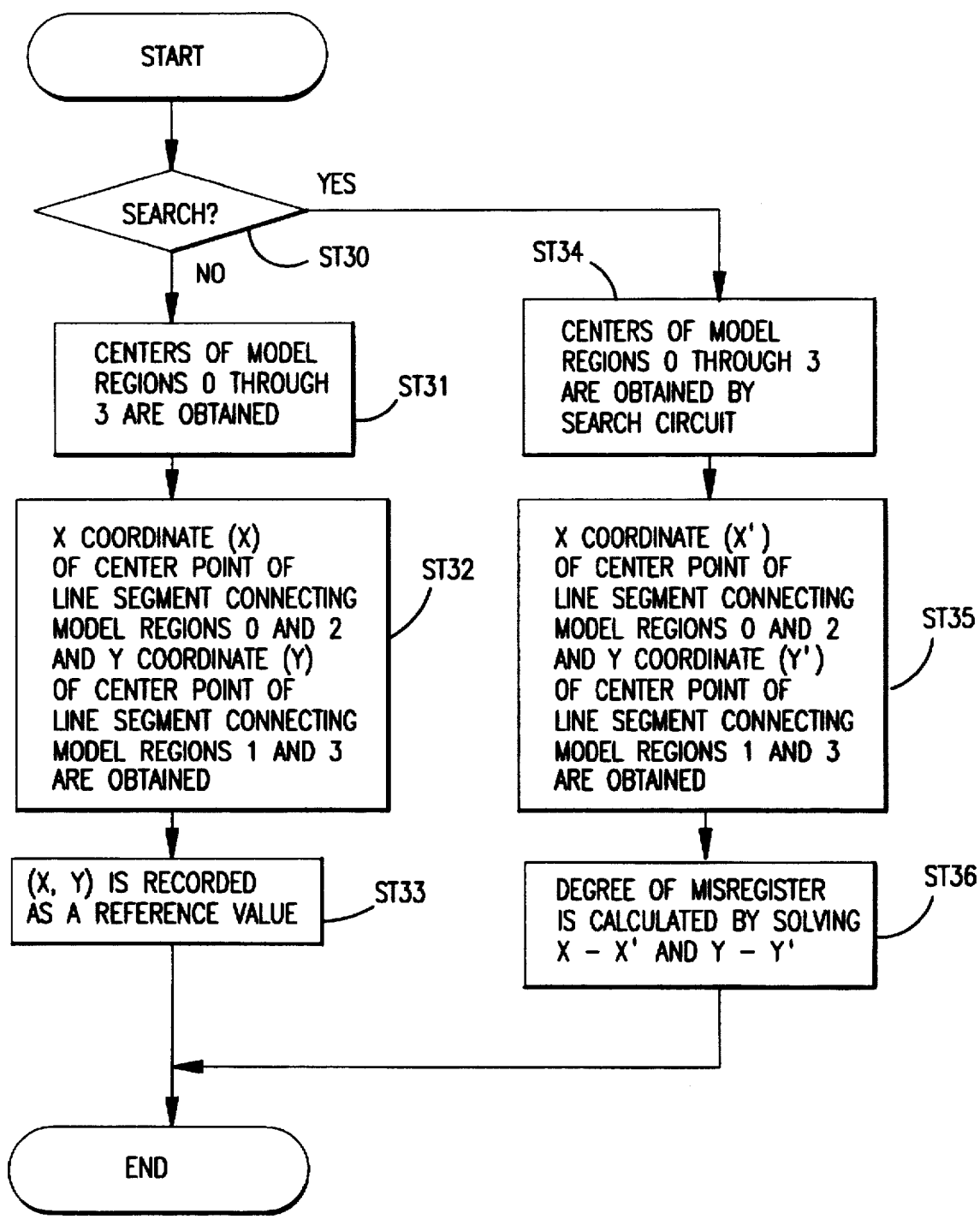
FIG. 16 is a flowchart which illustrates the function of another unit to calculate degree of misregistration.

The algorithm used to calculate the degree of misregistration of a round object is not limited to the example given above. If the calculation is done according to the flowchart shown in FIG. 16, for example, somewhat greater accuracy will be achieved.

Figure 17A:
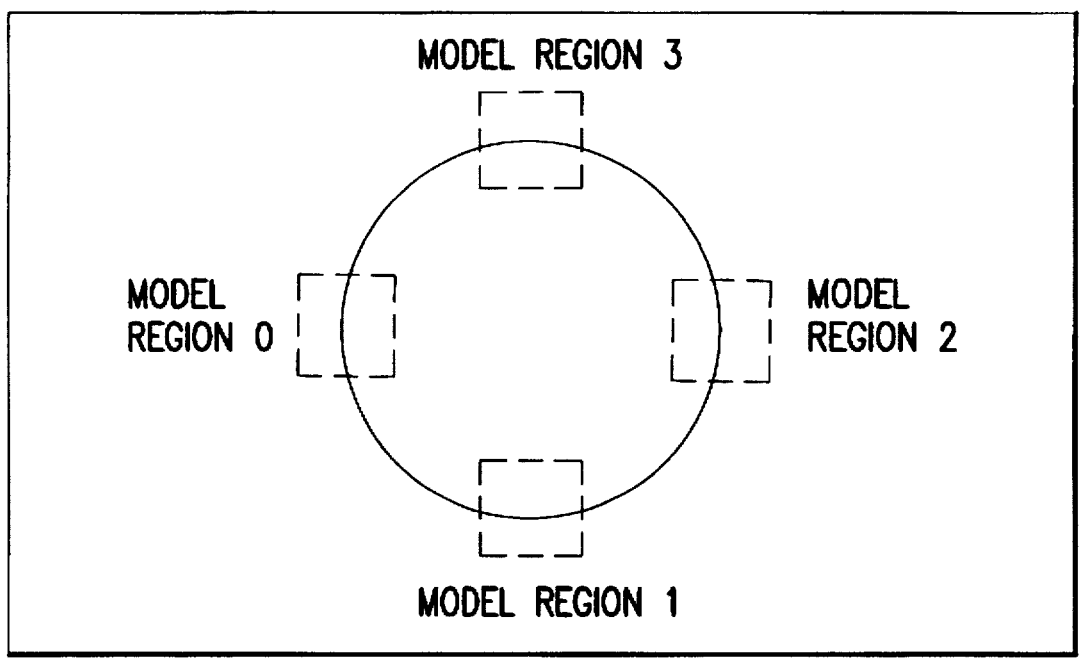
FIGS. 17(A)–17(B) illustrates the operation of the unit which calculates degree of misregistration.
Figure 17B:
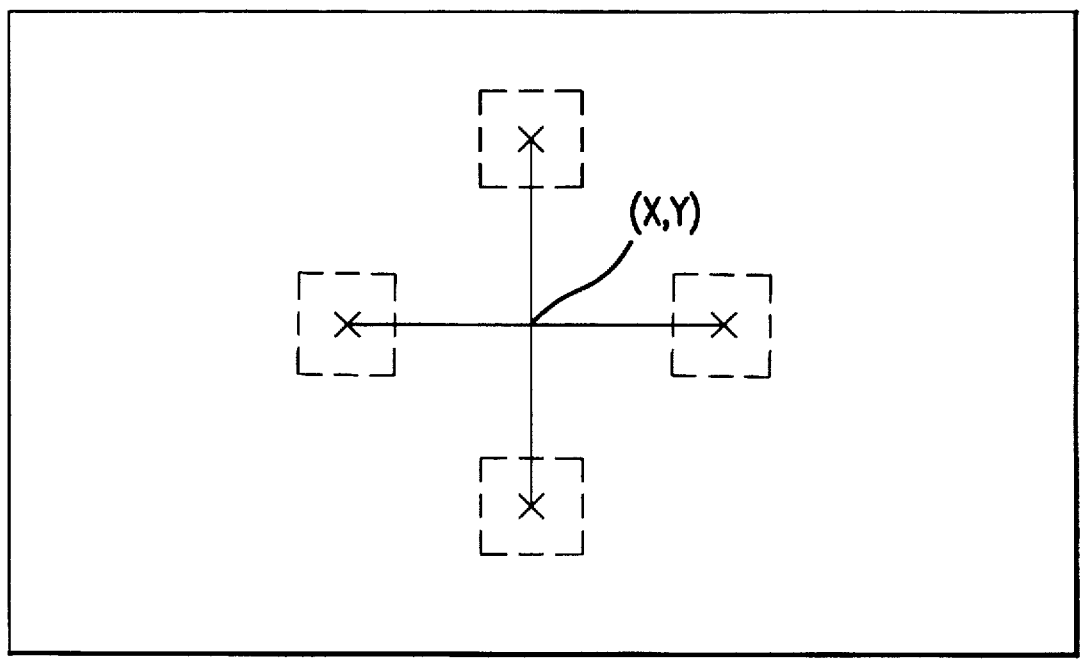

First, as preprocessing, the image of the object which is to be used as a model is captured by a camera and recorded in memory 12. Let us assume a recorded image resembling that shown in FIG. 17(A). We draw hypothetical X and Y axes through the center of the circle and obtain four model regions. Regions 0 through 3, whose centers are the intersections of the axes with the circle. We then obtain the X coordinate of the center point between Regions 1 and 3, the regions on the X axis, and the Y coordinate of the center point between Regions 0 and 2, the regions on the Y axis. We take coordinate position (X, Y) as a reference point (See FIG. 17 (B)) and record this in memory 18 shown in FIG. 7 (Steps 30 through 33). In this example too, model generator 14 operates simultaneously just as in the embodiment discussed earlier, generating rotated images of each of the model regions and storing them in model memory 16.

To actually determine the location of each of the model regions, we obtained each model region as described above and recorded their center coordinates as reference point (X, Y). It would also be possible when recording data to first obtain the center of the circle and record its center coordinates as reference point (X, Y). We would then obtain the X and Y axes intersecting this center point and detect the intersections of each axis with the circle. In this way we could determine the location of each of the model regions.

In the search processing, circuit 19 is made to search the data representing the image of the object to be inspected to detect model regions 0 through 3 and obtain their center coordinates (Step 34).

Figure 18A:
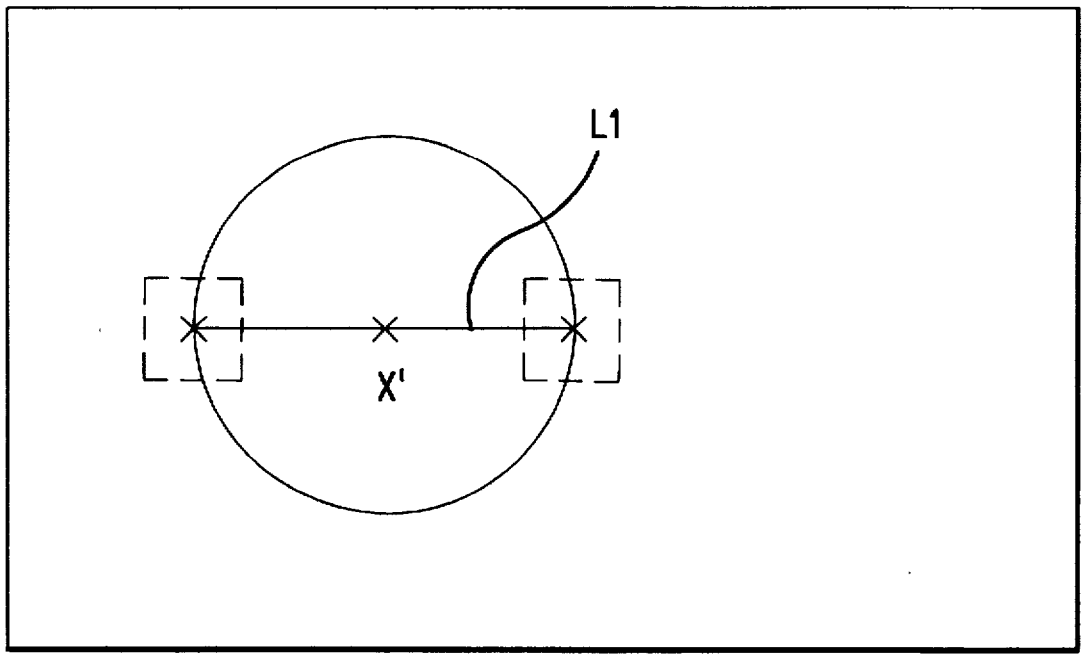
FIGS. 18(A)–18(B) illustrates the operation of the unit which calculates degree of misregistration.
Figure 18B:
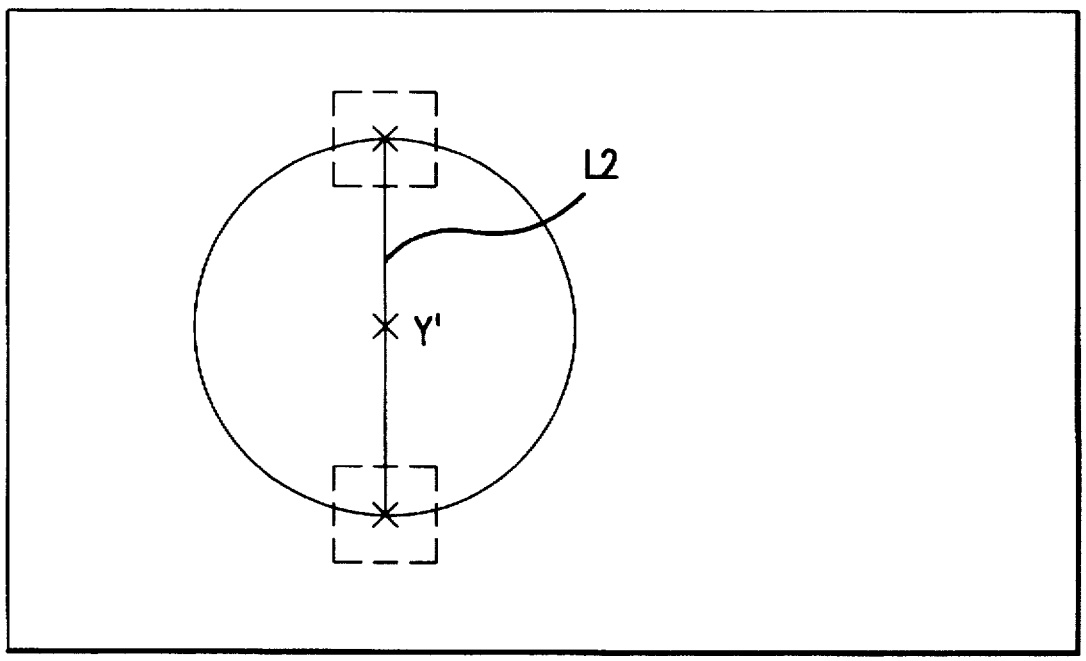

Next, the X coordinate (X') of the center point of line segment $L_1$, which links the centers of model regions 0 and 2 is found (See FIG. 18(A)), as is the Y coordinate Y') of the center point of line segment $L_2$, which links the centers of model regions 1 and 3 (See FIG. 18(B)) (Step 35).

The differences $d_x$ and $d_y$ between the reference values (X, Y) and the coordinates (X', Y') obtained from the center points of the lines passing through the centers of each of the model regions is obtained by solving the following equations.

$$d_x = X_1 - X'_1$$

$$d_y = X_1 - Y'_0$$

These differences yield the degree of misregistration in each direction (Step 36). When the degree of misregistration has been found in this way, the image data representing the object to be inspected are moved in parallel (i.e., scrolled) the distance of the misregistration, just as in the embodiment discussed earlier. The specified matching processing is then executed to determine the quality of the object.

As has been discussed, the device and method to detect degree of misregistration according to this invention allow the location of a model region to be obtained accurately even if the angular orientation of the actual object differs from that of the model region when it is detected. This, in turn, allows a line segment to be drawn accurately between the two coordinate points obtained in this way. By obtaining the location of this line segment under normal circumstances as a reference value and obtaining the distance the object is shifted from this reference value, we can accurately obtain the angular rotation of the object and the distance of its misregistration in directions X and Y.

The device to measure an image in which such a misregistration detection device is implemented can use this misregistration value to correct the location and orientation of either the data representing the captured image or those representing the reference image. This will insure that the image is recognized properly.

When the recording device of this invention records a number of misrotated model images, the actual imaging process requires that the image data be collected only once with the object placed at a given angle. Once it receives the conditions governing misrotation (viz., the range of the angle over which images are to be generated and the width of each step), the device automatically executes a series of affine transformations, generating and recording a model image at each angle of misrotation. This method makes the recording device much easier to operate than its predecessors, and it allows the proper angle of misrotation to be achieved.

We claim:

1. A method of detecting a dislocation of an object image with respect to a model image, the object image being represented by object image data and the model image being represented by standard image data, the method comprising the steps of:

establishing two standard image regions in the standard image data;

generating a plurality of rotated standard image regions for each of the two standard image regions;

generating a standard delimiting value based on geometric characteristics of the two standard image regions;

extracting two object image regions from the object image data corresponding to the two standard image regions and the plurality of rotated standard image regions;

generating an object delimiting value based on geometric characteristics of the two object image regions;

comparing the object delimiting value with the standard delimiting value to detect a dislocation of the object image with respect to the standard image.

2. The method of claim 1, wherein the dislocation of the object image comprises a degree of misregistration represented in two directions and an angle of misrotation with respect to the standard image.

3. The method of claim 1, further comprising the steps of:

after the establishing step, generating geometric characteristics of each standard image region based on that region's center of gravity; and after the extracting step, generating geometric characteristics of each object image region based on that region's center of gravity.

4. A device for detecting a dislocation of an object image, comprising:

means for generating standard image data representing a model image of the object image;

a first memory that stores image data of two standard image regions of the standard image data and the standard delimiting value;

a first calculation unit that generates a standard delimiting value based upon geometric characteristics of the two standard image regions of the standard image data;

wherein the first memory stores the standard delimiting value;

an image rotating unit that generates a plurality of processed standard image regions wherein each of the successive processed image data represents the respective standard image region rotated by a different incremental angular amount;

second memory that stores the plurality of processed standard image data;

an extracting unit that extracts two object image regions from object image data by matching the object image data with each of the processed standard image regions;

a second calculation unit that calculates an object delimiting value based upon geometric characteristics of the object image regions; and a comparison unit that compares the object delimiting value with the standard delimiting value to determine the dislocation of the object image.

5. The device of claim 4, wherein the means for generating standard image data comprises a scanner.

6. The device of claim 4, wherein the dislocation of the object image comprises a degree of misregistration in two directions and an angle of misrotation with respect to the standard image data.

7. The device of claim 4, wherein:

each geometric characteristic used by the first calculation unit is the center of gravity of the respective standard image region, and each geometric characteristic used by the second calculation unit is the center of gravity of the respective object image region.

8. The device of claim 4, wherein:

the geometric characteristics of each standard image region comprise two corners of the standard image region, and the geometric characteristics of each object image region comprise two corners of the object image region.

9. The device of claim 4, wherein:

the standard delimiting value is defined by an angle formed between a line linking the two standard image regions and a reference line, the object delimiting value is defined by an angle formed between a line linking the two object image regions and the reference line, and the angle of misrotation is defined by the difference between the angle of the standard delimiting value and the angle of the object delimiting value.

10. The device of claim 4, wherein:

the standard delimiting value is defined by a coordinate of the first standard image region and a coordinate of the second standard image region, the object delimiting value is defined by a coordinate of the first object image region and a coordinate of the second object image region, and degree of misregistration is defined by difference between said coordinates for the first standard image region and the first object image region and between said coordinates for the second standard image region and the second object image region.

11. A device for detecting a dislocation of an object image, the object image being represented by object image data, the device comprising:

means to generate standard image data, the standard image data representing a model of the object image;

a first extracting unit that extracts two standard image regions from the standard image data;

a first delimiting value unit that obtains a standard delimiting value from geometric characteristics of the two standard image regions;

a first memory unit that stores the two standard image regions and said delimiting value;

a second memory unit that stores a plurality of processed standard image data regions, each processed standard image data region representing one of the two standard image regions rotated by different incremental angular amounts;

a second extracting unit that extracts two object image regions from the object image data by matching the object image data with the standard image regions, a second delimiting value unit that generates an object delimiting value based upon geometric characteristics of the two object image regions; and a calculation unit that calculates a dislocation of the object image by comparing the object delimiting value with the standard delimiting value.

12. The device of claim 11, wherein the calculation unit calculates the dislocation of the object image as a degree of misregistration in two directions and an angle of misrotation with respect to the standard image.

13. The device of claim 11, further comprising a model generator that generates the plurality of processed standard image data by executing an affine transformation.

14. An image processing device for recognizing a standard image in an object image, comprising:

a dislocation detecting device, comprising:

means for generating standard image data representing the standard image;

a first memory that stores image data of two standard image regions of the standard image, a delimiting value unit for determining a standard delimiting value from geometric characteristics of each of the two standard image regions, wherein the first memory stores the standard delimiting value;

a second memory that stores a plurality of processed standard image data regions, wherein each successive processed standard image data region is misrotated by successive incremental angular amount;

an extracting unit that extracts two object image regions from object image data by matching the object image data with each of the plurality of processed standard image data;

a calculation unit that calculates an object delimiting value from the geometric characteristics of each of the object image regions and calculates a dislocation of the object image by comparing the object delimiting value with the standard delimiting value; and an image matching unit that matches the object image data with the standard image data using the dislocation of the object image.

15. A method for detecting a dislocation of a circular object image, the object image being represented by object image data, comprising the steps of:

generating standard image data representing a model of the object image to be detected;

establishing a standard image coordinate system for the standard image data with an image origin;

establishing four standard image regions, each region positioned at an intersection of an axis of the standard image coordinate system and a boundary of the standard image data;

determining a standard image reference coordinate from an intersection of two line segments created by joining opposing standard image regions;

extracting four object image regions, each region positioned oppositely from another region on a boundary of the object image data;

determining an object image reference coordinate from an intersection of two line segments created by joining opposing object image regions, using the same origin used for the standard image coordinate system; and determining a degree of dislocation of the object image data by comparing the coordinates of the object image reference coordinate with the coordinates of the standard image reference coordinate.

* * * * *